United States Patent
Li et al.

(10) Patent No.: US 12,124,389 B2
(45) Date of Patent: Oct. 22, 2024

(54) IO TASK PROCESSING METHOD AND APPARATUS, AND COMPUTER DEVICE AND STORAGE MEDIUM

(71) Applicant: SUZHOU METABRAIN INTELLIGENT TECHNOLOGY CO., LTD, Suzhou (CN)

(72) Inventors: Pengshuai Li, Suzhou (CN); Hao Fang, Suzhou (CN); Huaixu Ma, Suzhou (CN); Yunlong Fan, Suzhou (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/567,253

(22) PCT Filed: Apr. 26, 2022

(86) PCT No.: PCT/CN2022/089352
§ 371 (c)(1),
(2) Date: Dec. 5, 2023

(87) PCT Pub. No.: WO2023/071101
PCT Pub. Date: May 4, 2023

(65) Prior Publication Data
US 2024/0264958 A1  Aug. 8, 2024

(30) Foreign Application Priority Data
Oct. 25, 2021 (CN) .......................... 202111246169.1

(51) Int. Cl.
*G06F 13/20* (2006.01)
(52) U.S. Cl.
CPC .................................. *G06F 13/20* (2013.01)

(58) Field of Classification Search
CPC ........................... G06F 9/4887; G06Q 10/107
See application file for complete search history.

(56) References Cited

U.S. PATENT DOCUMENTS

| | | | |
|---|---|---|---|
| 11,269,635 B1 * | 3/2022 | Lemoine | ............... G06F 9/5011 |
| 2008/0155043 A1 * | 6/2008 | Atsumi | ............... G06Q 10/107 |
| | | | 709/206 |

(Continued)

FOREIGN PATENT DOCUMENTS

| CN | 106886368 A | 6/2017 |
|---|---|---|
| CN | 108804035 A | 11/2018 |

(Continued)

OTHER PUBLICATIONS

International Search Report dated Jun. 30, 2022; International Application No. PCT/CN2022/089352.

(Continued)

*Primary Examiner* — Getente A Yimer
(74) *Attorney, Agent, or Firm* — DINSMORE & SHOHL LLP (57) ABSTRACT

An IO task processing method includes: S1, receiving a plurality of IO tasks issued by a host and executing them separately in sequence, and making statistics of a first mean value of time consumed in processing a single IO when executed separately in sequence; S2, continuing to receive a plurality of IO tasks issued by the host, merging the IO tasks for execution, and determining an optimal IO merging time according to the first mean value of the time consumed in processing a single IO when executed separately in sequence; and S3, according to the optimal IO merging time, continuing to execute remaining IO tasks issued by the host.

14 Claims, 5 Drawing Sheets

(56) References Cited

U.S. PATENT DOCUMENTS

| | | | |
|---|---|---|---|
| 2012/0024044 A1* | 2/2012 | Tao | G01V 5/26 |
| | | | 73/30.01 |
| 2012/0131586 A1* | 5/2012 | Kang | G06F 9/4887 |
| | | | 718/102 |
| 2013/0159557 A1* | 6/2013 | Bita | G06F 3/0604 |
| | | | 710/6 |
| 2018/0041415 A1 | 2/2018 | Nitinawarat et al. | |

FOREIGN PATENT DOCUMENTS

| | | | |
|---|---|---|---|
| CN | 109471594 A | 3/2019 | |
| CN | 111694770 A | 9/2020 | |
| CN | 113031873 A | 6/2021 | |
| CN | 113687796 A | 11/2021 | |

OTHER PUBLICATIONS

Written Opinion dated Jun. 30, 2022; Application No. PCT/CN2022/089352.

First office action of corresponding Chinese application No. 2021112461691.

Du Jiancheng, Optimum Degree of Parallelism-based Task Dependence Graph Scheduling Scheme, vol. 10, dated Oct. 5, 1999, 1 page.

* cited by examiner

Fig. 6

IO TASK PROCESSING METHOD AND APPARATUS, AND COMPUTER DEVICE AND STORAGE MEDIUM

CROSS-REFERENCE OF RELATED APPLICATIONS

This application is the U.S. National stage of PCT/CN2022/089352 filed on Apr. 26, 2022, which claims priority to Chinese patent application No. 202111246169.1, filed with the China National Intellectual Property Administration on Oct. 25, 2021 and entitled "IO task processing method and apparatus, and computer device and storage medium", the disclosure of which is hereby incorporated by reference in its entirety.

TECHNICAL FIELD

The present application relates to the technical field of storage, in particular to an IO task processing method and apparatus, and a computer device and a storage medium.

BACKGROUND

When reading a data block from or writing same into a disk, a host will continuously issue IO (IN/OUT) requests. The simplest way to process these IO requests is to sequentially and separately execute them, but this method is less efficient in processing. If IO requests having adjacent read/write positions are first merged according to the position information of disk read/write, and then reading from/writing to a disk is performed, the processing efficiency will be increased to a certain extent.

The inventors realize that there are some methods regarding IO merging at present, but these methods mainly focus on how to merge IOs, but ignore the duration of IO merging. One point to note is that the duration of IO merging is not the longer the better. The reason is that after IO merging is started, a host needs to wait for the completion of IO merging before reading from and writing to a disk. Sometimes, a too long IO merging duration could instead reduce the IO processing efficiency. Therefore, how to select an IO merging duration is an urgent problem to be solved.

SUMMARY

In one aspect, provided in the present application is an IO task processing method, which comprises:
S1, receiving a plurality of IO tasks issued by a host and executing them separately in sequence, and making statistics of a first mean value of time consumed in processing a single IO when executed separately in sequence;
S2, continuing to receive a plurality of IO tasks issued by the host, merging the IO tasks for execution, and determining an optimal IO merging time according to the first mean value of the time consumed in processing a single IO when executed separately in sequence; and
S3, according to the optimal IO merging time, continuing to execute remaining IO tasks issued by the host.
In one embodiment, the step S1 further comprises:
calculating a variance of the time consumed when executing the IO tasks separately in sequence; and
in response to it being determined, according to the variance, that the time consumed in processing different IO tasks is stable, executing the step S2; or in response to it being determined, according to the variance, that the time consumed in processing different IO tasks is unstable, continuing to keep executing the IO tasks separately in sequence.

In one embodiment, the step of determining an optimal IO merging time according to the first mean value of the time consumed in processing a single IO when executed separately in sequence comprises:
acquiring an initialized merging time for merging the IO tasks;
making statistics of a total time consumed in processing the merged IO tasks, wherein the step of processing the merged IO tasks comprises performing reading/writing processing on the merged IO tasks and remaining unmerged IO tasks;
calculating a second mean value of the time consumed in processing each IO during merging of the IO tasks;
according to the first mean value of the time consumed in processing a single IO when executed separately in sequence and the second mean value of the time consumed in processing each IO during merging of the IO tasks, calculating an efficiency increase value during merging of the IO tasks; and
when the efficiency increase value is greater than 0, taking the initialized merging time as an optimal IO merging time.

In one embodiment, the step of calculating a second mean value of the time consumed in processing each IO during merging of the IO tasks comprises:
acquiring a total number of tasks of the merged IO tasks and the remaining unmerged IO tasks; and
according to the merging time, the total time consumed in processing the merged IO tasks and the total number of tasks, calculating a second mean value of the time consumed in processing each IO during merging of the IO tasks.

In one embodiment, the step of calculating a second mean value of the time consumed in processing each IO during merging of the IO tasks comprises:

$$u_2 = \frac{x_t + t}{n}$$

where $u_2$ is the second mean value of the time consumed in processing each IO during merging of the IO tasks, $x_t$ is the merging time, t is the total time consumed in processing the merged IO tasks, and n is the total number of tasks of the merged IO tasks and the remaining unmerged IO tasks.

In one embodiment, the step of calculating an efficiency increase value during merging of the IO tasks comprises:

$$\eta = \frac{u_1 - u_2}{u_1} \times 100$$

where $\eta$ is the efficiency increase value, $u_1$ is the first mean value of the time consumed in processing a single IO, and $u_2$ is the second mean value of the time consumed in processing each IO during merging of the IO tasks.

In one embodiment, the step of determining an optimal IO merging time according to the first mean value of the time consumed in processing a single IO when executed separately in sequence further comprises:

adjusting the merging time for merging the IO tasks several times, calculating a plurality of efficiency increase values after adjustments, and taking a merging time corresponding to a maximum efficiency increase value as an optimal IO merging time.

In one embodiment, the step of adjusting the merging time for merging the IO tasks comprises:
comparing the efficiency increase value with 0, and adjusting the merging time for merging the IO tasks according to a comparison result.

In one embodiment, the step of adjusting the merging time for merging the IO tasks comprises:

$$x_t = \begin{cases} 2x_t, \eta \geq 0 \\ 0.5x_t, \eta < 0 \end{cases}$$

where $x_t$ is the merging time, and n is the efficiency increase value.

In another aspect, provided is an IO task processing apparatus, which comprises a separate execution module, an optimization module and a post-optimization processing module, wherein:
the separate execution module is configured to receive a plurality of IO tasks issued by a host and execute them separately in sequence, and to make statistics of a first mean value of time consumed in processing a single IO when executed separately in sequence;
the optimization module is configured to continue to receive a plurality of IO tasks issued by the host, to merge the IO tasks for execution, and to determine an optimal IO merging time according to the first mean value of the time consumed in processing a single IO when executed separately in sequence; and
the post-optimization processing module is configured to continue to execute remaining IO tasks issued by the host according to the optimal IO merging time.

In yet another aspect, provided is a computer device, comprising a memory, one or more processors, and computer-readable instructions that are stored on the memory and can be run on the processor, wherein the processor, when executing the computer-readable instructions, implements steps of the IO task processing method provided in any one of the above-mentioned embodiments. In still another aspect, provided is/are one or more non-volatile computer-readable storage media, configured to store computer-readable instructions, wherein the computer-readable instructions, when executed by one or more processors, implement the steps of the IO task processing method provided in any one of the above-mentioned embodiments.

The details of one or more embodiments of the present application will be presented in the accompanying drawings and descriptions below. Other features and advantages of the present application will become apparent from the description, accompanying drawings and claims.

DETAILED DESCRIPTION

To make the objectives, technical solutions and advantages of the present application clearer, the present application will be described hereinafter in further detail with reference to the accompanying drawings and embodiments. It should be understood that the specific embodiments described herein are for the purpose of explaining the present application only, and are not intended to be limiting.

Figure 1:
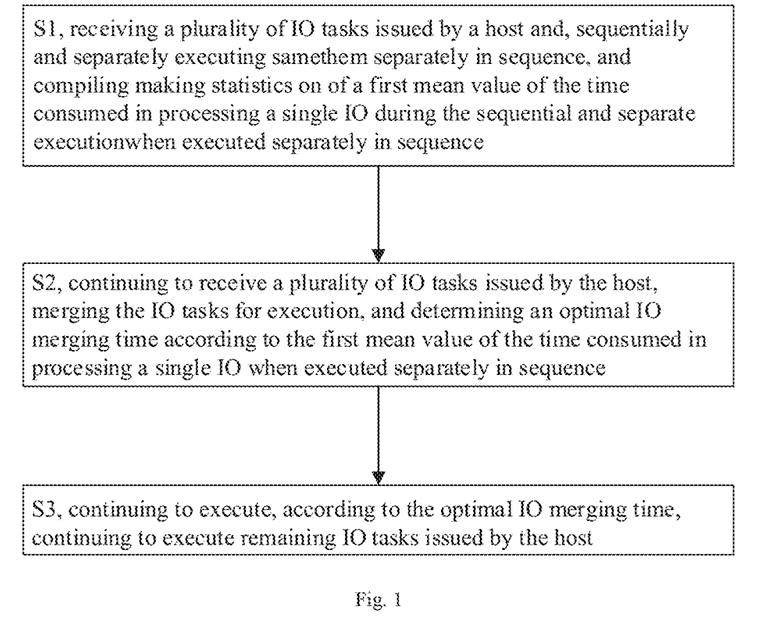
FIG. 1 is a schematic flow chart of an IO task processing method provided in the present application according to one or more embodiments.

In one embodiment of the present application, an IO task processing method is provided, which will be described hereinafter as an example of the method applied to a computer device and which, as shown in FIG. 1, comprises the following steps:
S1, receiving a plurality of IO tasks issued by a host and executing them separately in sequence, and making statistics of a first mean value of time consumed in processing a single IO when executed separately in sequence;
S2, continuing to receive a plurality of IO tasks issued by the host, merging the IO tasks for execution, and determining an optimal IO merging time according to the first mean value of the time consumed in processing a single IO when executed separately in sequence; and
S3, continuing to execute remaining IO tasks issued by the host according to the optimal IO merging time.

The method of the present application mainly includes three stages. In a first stage, the efficiency of processing a single IO is analyzed without starting IO merging; in a second stage, the IO merging time is optimized by means of heuristic learning; and in a third stage, IO requests issued by the host continue to be processed using the IO merging time obtained in the second stage.

In the IO task processing method, the IO reading and writing efficiency of the host can be effectively increased by means of IO merging, thereby saving on system resources.

In one embodiment, the step S1 further comprises:
calculating a variance of the time consumed when executing the IO tasks separately in sequence; and
in response to it being determined, according to the variance, that the time consumed in processing different IO tasks is stable, executing the step S2; or in response to it being determined, according to the variance, that the time consumed in processing different IO tasks is unstable, continuing to keep executing the IO tasks separately in sequence.

Figure 2:
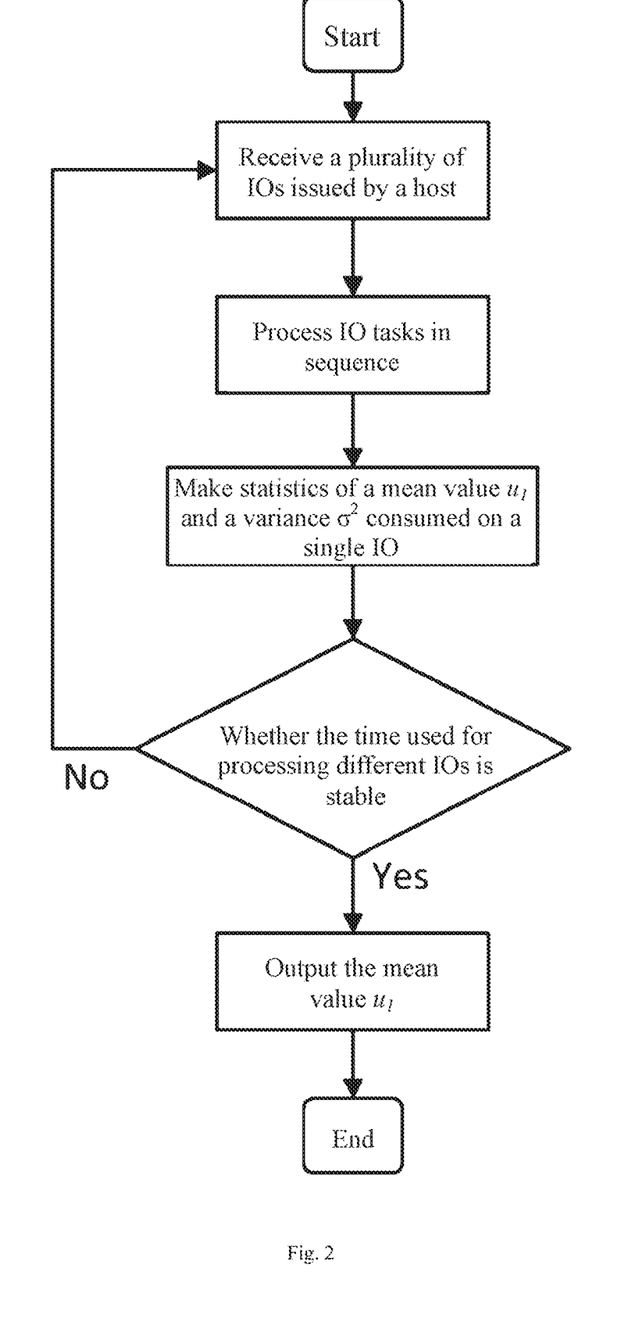
FIG. 2 is a schematic flow chart of a separate execution stage provided in the present application according to one or more embodiments.

Specifically, as shown in FIG. 2, in the first stage, under the condition of not starting IO merging, a plurality of IOs issued by the host are received and are processed respectively. Then, statistics is made of a mean value $u_1$ and a variance $\sigma^2$ of the time consumed in processing each IO.

Whether the time consumed in processing different IOs is stable is analyzed by means of the variance, wherein if the time is unstable, IO merging continues to be not started; and if the time is stable, the mean value $u_1$ of the time consumed in a single IO is output, and the second stage starts.

In one embodiment, the step of determining an IO merging time according to the first mean value of the time consumed in processing a single IO when executed separately in sequence comprises:

acquiring an initialized merging time for merging the IO tasks;

making statistics of a total time consumed in processing the merged IO tasks, wherein the step of processing the merged IO tasks comprises performing reading/writing processing on the merged IO tasks and remaining unmerged IO tasks;

calculating a second mean value of the time consumed in processing each IO during merging of the IO tasks;

according to the first mean value of the time consumed in processing a single IO when executed separately in sequence and the second mean value of the time consumed in processing each IO during merging of the IO tasks, calculating an efficiency increase value during merging of the IO tasks; and when the efficiency increase value is greater than 0, taking the initialized merging time as an optimal IO merging time.

Wherein in response to the efficiency increase value being greater than 0, a computer device takes the initialized merging time as an optimal IO merging time.

In one embodiment, the step of calculating a second mean value of the time consumed in processing each IO during merging of the IO tasks comprises:

$$u_2 = \frac{x_t + t}{n}$$

where $u_2$ is the second mean value of the time consumed in processing each IO during merging of the IO tasks, $x_t$ is the merging time, t is the total time consumed in processing the merged IO tasks, and n is the total number of tasks of the merged IO tasks and the remaining unmerged IO tasks.

In one embodiment, the step of calculating a second mean value of the time consumed in processing each IO during merging of the IO tasks comprises:

acquiring a total number of tasks of the merged IO tasks and the remaining unmerged IO tasks; and according to the merging time, the total time consumed in processing the merged IO tasks and the total number of tasks, calculating a second mean value of the time consumed in processing each IO during merging of the IO tasks.

In one embodiment, the step of calculating an efficiency increase value during merging of the IO tasks comprises:

$$\eta = \frac{u_1 - u_2}{u_1} \times 100$$

where $\eta$ is the efficiency increase value, $u_1$ is the first mean value of the time consumed in processing a single IO, and $u_2$ is the second mean value of the time consumed in processing each IO during merging of the IO tasks.

In one embodiment, the step of determining an IO merging time according to the first mean value of the time consumed in processing a single IO when executed separately in sequence further comprises:

adjusting the merging time for merging the IO tasks several times, calculating a plurality of efficiency increase values after adjustments, and taking a merging time corresponding to a maximum efficiency increase value as an optimal IO merging time.

In one embodiment, the step of adjusting the merging time for merging the IO tasks comprises:

comparing the efficiency increase value with 0, and adjusting the merging time for merging the IO tasks according to a comparison result.

In one embodiment, the step of adjusting the merging time for merging the IO tasks comprises:

$$x_t = \begin{cases} 2x_t, & \eta \geq 0 \\ 0.5x_t, & \eta < 0 \end{cases}$$

where $x_t$ is the merging time, and n is the efficiency increase value.

Figure 3:
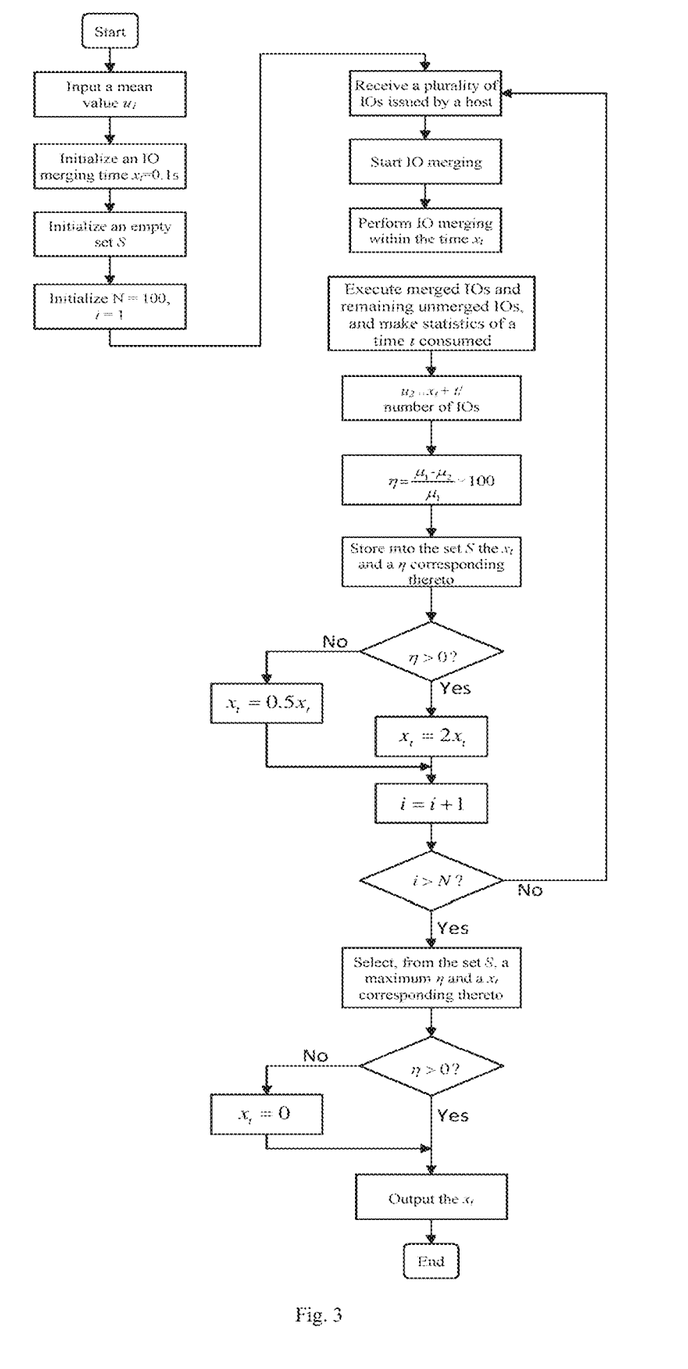
FIG. 3 is a schematic flow chart of an optimization stage provided in the present application according to one or more embodiments.

Specifically, as shown in FIG. 3, the second stage includes the following steps:

S21, inputting the mean value $u_1$ obtained in the first stage, initializing an IO merging time $x_t = 0.1$ s, initializing an empty set S, initializing a maximum number of optimizations N=100, and initializing the current number of iterations i=1;

S22, receiving a plurality of IOs ($IO_1$, $IO_2$, . . . , $IO_n$) issued by the host, starting IO merging, and merging the IOs within the IO merging time xi;

S23, after IO merging is finished, performing reading/writing processing on the merged IOs and remaining unmerged IOs, and making statistics of a total time t consumed;

S24, calculating, after IO merging is started, a mean value of the time consumed in processing each IO;

$$u_2 = \frac{x_t + t}{n};$$

S25, making statistics of an efficiency increase for IO processing after IO merging is started:

$$\eta = \frac{u_1 - u_2}{u_1} \times 100$$

S26, filing: storing into the set S the current I0 merging time xx and an efficiency increase η corresponding thereto;

S27, adjusting the IO merging time:

$$x_t = \begin{cases} 2x_t, & \eta \geq 0 \\ 0.5x_t, & \eta < 0 \end{cases}$$

S28, adjusting the current number of iterations: i=i+1;

S29, determining whether i is greater than the maximum number of optimizations N:

If i≤N, returning to step 2 and continuing to optimize the IO merging time; and

If i>N, selecting, from the set S, a maximum efficiency increase η (denoted as $\eta_{best}$) and an IO merging time $x_t$ corresponding thereto;

S2A, if $\eta_{best} \leq 0$, letting the IO merging time $x_t = 0$, otherwise, remaining unchanged; and S2B, outputting an optimized IO merging time $x_t$, and proceeding into the third stage.

Figure 4:
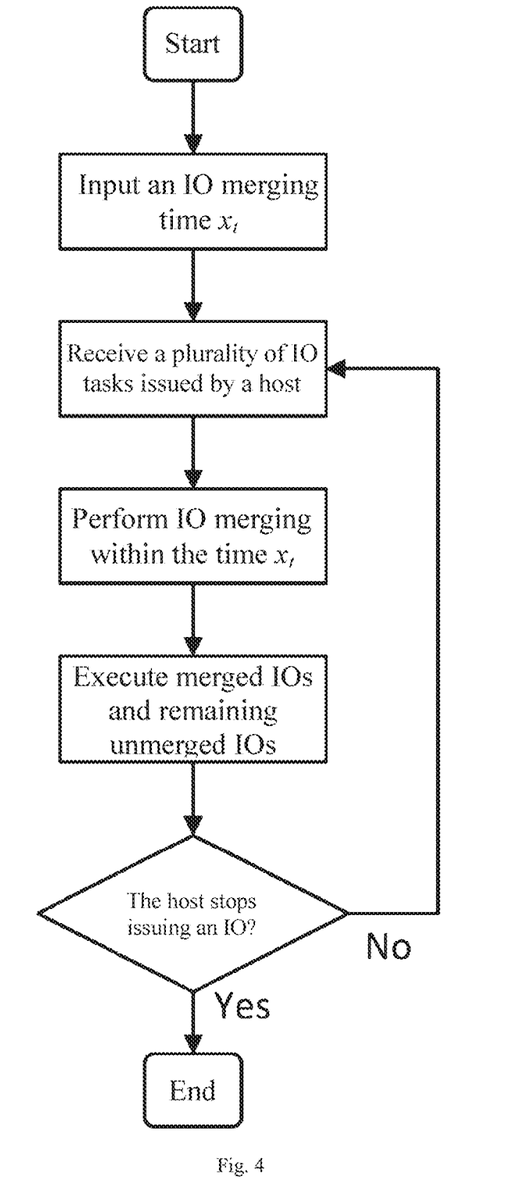
FIG. 4 is a schematic flow chart of a post-optimization processing stage provided in the present application according to one or more embodiments.

As shown in FIG. 4, the third stage includes the following steps:

S31, setting the IO merging time as the IO merging time x_t output in the second stage;

S32, receiving a plurality of IO requests issued by a host, and merging the IOs within the IO merging time $x_t$;

S23, after IO merging is finished, performing reading/writing processing on merged IOs and remaining unmerged IOs; and S34, repeating the steps S32 and S33 of this stage until the host no longer issues an IO request.

It should be understood that although the steps in the flow charts of FIGS. 1-4 are shown in order as indicated by the arrows, these steps are not necessarily executed in order as indicated by the arrows. Unless expressly stated herein, there are no strict sequential limitations on the execution of these steps, and these steps may be executed in other orders. Furthermore, at least a portion of the steps in FIGS. 1-4 may include a plurality of sub-steps or stages. These sub-steps or stages are not necessarily executed at the same moment, but may be executed at different moments. These sub-steps or stages are not necessarily executed in order, but may be executed in turn or alternately with other steps or at least a portion of sub-steps or stages of the other steps.

The IO merging time is optimized by means of heuristic learning, such that the optimal IO merging time may be determined adaptively according to the processed IO tasks, avoiding the influence of a too long or too short IO merging time on the IO processing efficiency.

Figure 5:
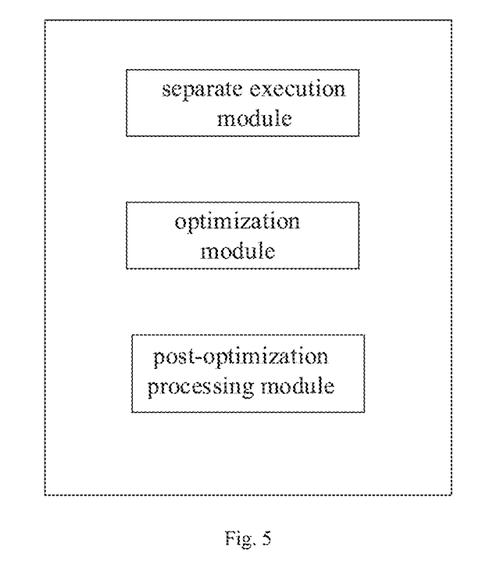
FIG. 5 is a structural block diagram of an IO task processing apparatus provided in the present application according to one or more embodiments.

In one embodiment, as shown in FIG. 5, provided is an IO task processing apparatus, which comprises a separate execution module, an optimization module and a post-optimization processing module, wherein:

the separate execution module is configured to receive a plurality of IO tasks issued by a host and execute them separately in sequence, and to make statistics of a first mean value of time consumed in processing a single IO when executed separately in sequence;

the optimization module is configured to continue to receive a plurality of IO tasks issued by the host, to merge the IO tasks for execution, and to determine an optimal IO merging time according to the first mean value of the time consumed in processing a single IO when executed separately in sequence; and the post-optimization processing module is configured to continue to execute remaining IO tasks issued by the host according to the optimal IO merging time.

In one embodiment, the separate execution module is further configured to calculate a variance of the time consumed when executing the IO tasks separately in sequence, and to determine, according to the variance, whether the time consumed in processing different IO tasks is stable.

In one embodiment, the optimization module is configured:

to acquire an initialized merging time for merging the IO tasks;

to make statistics of a total time consumed in processing the merged IO tasks, wherein the step of processing the merged IO tasks comprises performing reading/writing processing on merged IO tasks and remaining unmerged IO tasks;

to calculate a second mean value of the time consumed in processing each IO during merging of the IO tasks;

to calculate an efficiency increase value during merging of the IO tasks according to the first mean value of the time consumed in processing a single IO when executed separately in sequence and the second mean value of the time consumed in processing each IO during merging of the IO tasks; and to take the initialized merging time as an optimal IO merging time when the efficiency increase value is greater than 0.

In one embodiment, in the optimization module, the step of calculating a second mean value of the time consumed in processing each IO during merging of the IO tasks comprises: acquiring a total number of tasks of the merged IO tasks and the remaining unmerged IO tasks; and according to the merging time, the total time consumed in processing the merged IO tasks and the total number of tasks, calculating a second mean value of the time consumed in processing each IO during merging of the IO tasks.

In one embodiment, in the optimization module, the step of calculating a second mean value of the time consumed in processing each IO during merging of the IO tasks comprises:

$$u_2 = \frac{x_t + t}{n}$$

where $u_2$ is the second mean value of the time consumed in processing each IO during merging of the IO tasks, $x_t$ is the merging time, t is the total time consumed in processing the merged IO tasks, and n is the total number of tasks of the merged IO tasks and the remaining unmerged IO tasks.

In one embodiment, in the optimization module, the step of calculating an efficiency increase value during merging of the IO tasks comprises:

$$\eta = \frac{u_1 - u_2}{u_1} \times 100$$

where $\eta$ is the efficiency increase value, $u_1$ is the first mean value of the time consumed in processing a single IO, and $u_2$ is the second mean value of the time consumed in processing each IO during merging of the IO tasks.

In one embodiment, in the optimization module, the step of determining an IO merging time according to the first mean value of the time consumed in processing a single IO when executed separately in sequence further comprises:

adjusting the merging time for merging the IO tasks several times, calculating a plurality of efficiency increase values after adjustments, and taking a merging time corresponding to a maximum efficiency increase value as an optimal IO merging time.

In one embodiment, in the optimization module, the step of adjusting the merging time for merging the IO tasks comprises: comparing the efficiency increase value with 0, and adjusting the merging time for merging the IO tasks according to a comparison result.

In one embodiment, in the optimization module, the step of adjusting the merging time for merging the IO tasks comprises:

$$x_t = \begin{cases} 2x_t, & \eta \geq 0 \\ 0.5x_t, & \eta < 0 \end{cases}$$

where $x_t$ is the merging time, and n is the efficiency increase value.

The specific definitions to the IO task processing apparatus may be found in the definitions to the IO task processing method described above and will not be repeated here. The modules in the IO task processing apparatus may be implemented in whole or in part by software, hardware and a combination thereof. Each of the above-mentioned modules may be embedded in or independent of a processor of a computer device in the form of hardware, and may also be stored in a memory of the computer device in the form of software, such that the processor can conveniently call the modules to execute operations corresponding to the modules.

Figure 6:
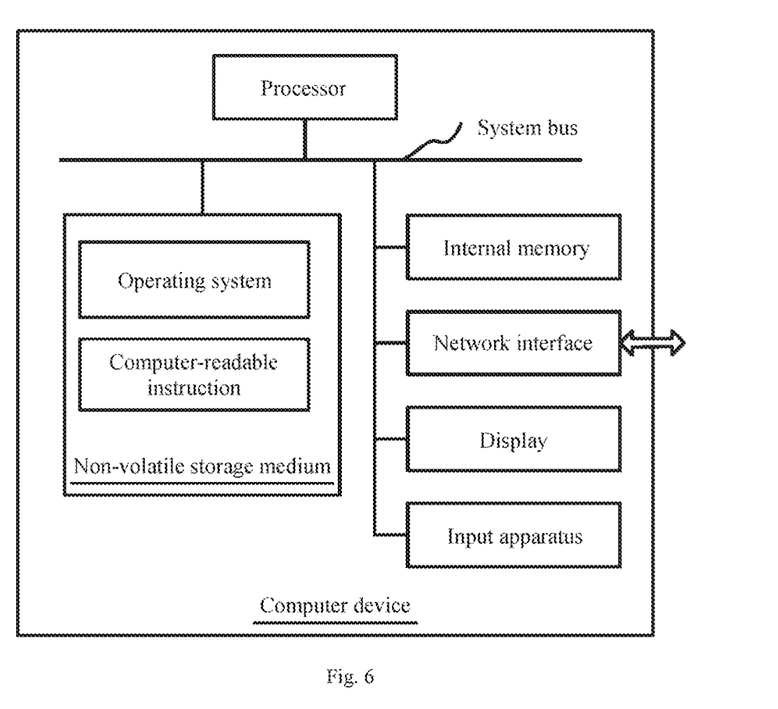
FIG. 6 is an internal structure diagram of a computer device provided in the present application according to one or more embodiments.

In one embodiment, a computer device is provided, which may be a terminal, the internal structure diagram of which may be as shown in FIG. 6. The computer device comprises a processor, a memory, a network interface, a display and an input apparatus, which are connected by means of a system bus. Wherein, the processor of the computer device is configured to provide computing and control capabilities. The memory of the computer device comprises a non-volatile storage medium and an internal memory. The non-volatile storage medium has an operating system and computer-readable instructions stored therein. The internal memory provides an environment for the operation of the operating system and the computer-readable instructions in the non-volatile storage medium. The network interface of the computer device is configured to communicate with an external terminal by means of a network connection. The computer-readable instructions, when executed by the processor, implement an IO task processing method. The display of the computer device may be a liquid crystal display or an e-ink display. The input apparatus of the computer device may be a touch layer covering the display, or a key, trackball or touchpad on the housing of the computer device, or an external keyboard, touchpad or mouse, etc.

It will be understood by a person skilled in the art that the structure illustrated in FIG. 6 is only a block diagram of part of the structure related to the solution of the present application and does not constitute a limitation on a computer device to which the solution of the present application is applied, and that a specific computer device may comprise more or fewer components than shown in the figures, or may be a combination of certain components, or may have a different component configuration.

In one embodiment, provided is a computer device, comprising a memory, one or more processors, and computer-readable instructions that are stored on the memory and can be run on the processor, wherein the processor, when executing the computer-readable instructions, implements steps of the IO task processing method provided in any one of the above-mentioned embodiments.

In one embodiment, provided in the present application is/are one or more non-volatile computer-readable storage media, configured to store computer-readable instructions, wherein the computer-readable instructions, when executed by one or more processors, cause the one or more processors to execute the steps of the method provided in any one of the above-mentioned embodiments.

A person of ordinary skill in the art will understand that implementing all or part of the processes in the methods of the above embodiments may be accomplished using computer-readable instructions to instruct relevant hardware, said computer-readable instructions being storable in a non-volatile computer-readable storage medium, which computer-readable instructions, when executed, may comprise processes such as the processes of the embodiments of each of the above-described methods. Wherein, any reference to a memory, storage, database, or other medium used in various embodiments provided in the present application may comprise a non-volatile memory and/or a volatile memory. The non-volatile memory may comprise a read-only memory (ROM), a programmable ROM (PROM), an electrically programmable ROM (EPROM), an electrically erasable programmable ROM (EEPROM) or a flash memory. The volatile memory may comprise a random access memory (RAM) or an external cache memory. As an illustration rather than a limitation, an RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a memory bus (Rambus) direct RAM (RDRAM), a direct Rambus dynamic RAM (DRDRAM), an Rambus dynamic RAM (RDRAM), etc.

The various technical features of the above embodiments can be combined in any way, and possible combinations of the various technical features of the above embodiments have not all been described for the sake of conciseness of description; however, as long as there is no contradiction in the combinations of these technical features, they shall be considered to be within the scope of the present description.

The above embodiments express only several manners of implementations of the present application, which are described in a more specific and detailed manner, but are not to be construed as a limitation of the patent scope of the present application. It should be noted that a person of ordinary skill in the art may, without departing from the concept of the present application, make a number of variations and improvements, all of which shall fall within the scope of protection of the present application. Therefore, the scope of protection of the patent of the present application shall be subject to the attached claims.

What is claimed is:

1. An INPUT/OUTPUT task processing method, wherein the method comprises:
   a first step, receiving a plurality of INPUT/OUTPUT tasks issued by a host and executing them separately in sequence, and making statistics of a first mean value of time consumed in processing a single INPUT/OUTPUT when executed separately in sequence;
   a second step, continuing to receive a plurality of INPUT/OUTPUT tasks issued by the host, merging the INPUT/OUTPUT tasks for execution, and determining an optimal INPUT/OUTPUT merging time according to the first mean value of the time consumed in processing a single INPUT/OUTPUT when executed separately in sequence, wherein,
      acquiring an initialized merging time for merging the INPUT/OUTPUT tasks;
      making statistics of a total time consumed in processing the merged INPUT/OUTPUT tasks, wherein the processing the merged INPUT/OUTPUT tasks comprises performing reading/writing processing on the merged INPUT/OUTPUT tasks and remaining unmerged INPUT/OUTPUT tasks;
      calculating a second mean value of the time consumed in processing each INPUT/OUTPUT during merging of the INPUT/OUTPUT tasks;
      according to the first mean value of the time consumed in processing a single INPUT/OUTPUT when executed separately in sequence and the second mean value of the time consumed in processing each INPUT/OUTPUT during merging of the INPUT/OUTPUT tasks, calculating an efficiency increase value during merging of the INPUT/OUTPUT tasks; and when the efficiency increase value is greater than 0, taking the initialized merging time as an optimal INPUT/OUTPUT merging time; and a third step, according to the optimal INPUT/OUTPUT merging time, continuing to execute remaining INPUT/OUTPUT tasks issued by the host;

wherein the step of calculating a second mean value of the time consumed in processing each INPUT/OUTPUT during merging of the INPUT/OUTPUT tasks comprises:

$$u_2 = \frac{x_t + t}{n}$$

where $u_2$ is the second mean value of the time consumed in processing each INPUT/OUTPUT during merging of the INPUT/OUTPUT tasks, $x_t$ is the merging time, t is the total time consumed in processing the merged INPUT/OUTPUT tasks, and n is the total number of tasks of the merged INPUT/OUTPUT tasks and the remaining unmerged INPUT/OUTPUT tasks, wherein $u_2$, $x_t$, t and n are positive integers;

wherein the step of calculating an efficiency increase value during merging of the INPUT/OUTPUT tasks comprises:

$$\eta = \frac{u_1 - u_2}{u_1} \times 100$$

where $\eta$ is the efficiency increase value, $u_1$ is the first mean value of the time consumed in processing a single INPUT/OUTPUT when executed separately in sequence, and $u_2$ is the second mean value of the time consumed in processing each INPUT/OUTPUT during merging of the INPUT/OUTPUT tasks, wherein $u_1$, $u_2$ are positive integers.

2. The INPUT/OUTPUT task processing method according to claim 1, wherein the first step further comprises:
calculating a variance of the time consumed when executing INPUT/OUTPUT tasks separately in sequence; and
in response to it being determined, according to the variance, that the time consumed in processing different INPUT/OUTPUT tasks is stable, executing the second step; or in response to it being determined, according to the variance, that the time consumed in processing different INPUT/OUTPUT tasks is unstable, continuing to keep executing the INPUT/OUTPUT tasks separately in sequence.

3. The INPUT/OUTPUT task processing method according to claim 1, wherein the step of calculating a second mean value of the time consumed in processing each INPUT/OUTPUT during merging of the INPUT/OUTPUT tasks comprises:
acquiring a total number of tasks of the merged INPUT/OUTPUT tasks and the remaining unmerged INPUT/OUTPUT tasks; and
according to the merging time, the total time consumed in processing the merged INPUT/OUTPUT tasks and the total number of tasks, calculating a second mean value of the time consumed in processing each INPUT/OUTPUT during merging of the INPUT/OUTPUT tasks.

4. The INPUT/OUTPUT task processing method according to claim 1, wherein the step of determining an optimal INPUT/OUTPUT merging time according to the first mean value of the time consumed in processing a single INPUT/OUTPUT when executed separately in sequence, further comprises:
adjusting the merging time for merging the INPUT/OUTPUT tasks several times, calculating a plurality of efficiency increase values after adjustments, and taking a merging time corresponding to a maximum efficiency increase value as an optimal INPUT/OUTPUT merging time.

5. The INPUT/OUTPUT task processing method according to claim 4, wherein the step of adjusting the merging time for merging the INPUT/OUTPUT tasks comprises:
comparing the efficiency increase value with 0, and adjusting the merging time for merging the INPUT/OUTPUT tasks according to a comparison result.

6. The INPUT/OUTPUT task processing method according to claim 5, wherein the step of adjusting the merging time for merging the INPUT/OUTPUT tasks comprises:

$$x_t = \begin{cases} 2x_t, \eta \geq 0 \\ 0.5x_t, \eta < 0 \end{cases}$$

where $x_t$ is the merging time, and n is the efficiency increase value.

7. A computer device, comprising a memory, one or more processors, and computer-readable instructions that are stored on the memory and can be run on the processor, wherein the processor is configured to implement steps of an INPUT/OUTPUT task processing method, the INPUT/OUTPUT task processing method comprises:
a first step, receiving a plurality of INPUT/OUTPUT tasks issued by a host and executing them separately in sequence, and making statistics of a first mean value of time consumed in processing a single INPUT/OUTPUT when executed separately in sequence;
a second step, continuing to receive a plurality of INPUT/OUTPUT tasks issued by the host, merging the INPUT/OUTPUT tasks for execution, and determining an optimal INPUT/OUTPUT merging time according to the first mean value of the time consumed in processing a single INPUT/OUTPUT when executed separately in sequence; wherein,
acquiring an initialized merging time for merging the INPUT/OUTPUT tasks;
making statistics of a total time consumed in processing the merged INPUT/OUTPUT tasks, wherein the processing the merged INPUT/OUTPUT tasks comprises performing reading/writing processing on the merged INPUT/OUTPUT tasks and remaining unmerged INPUT/OUTPUT tasks;
calculating a second mean value of the time consumed in processing each INPUT/OUTPUT during merging of the INPUT/OUTPUT tasks;
according to the first mean value of the time consumed in processing a single INPUT/OUTPUT when executed separately in sequence and the second mean value of the time consumed in processing each INPUT/OUTPUT during merging of the INPUT/

OUTPUT tasks, calculating an efficiency increase value during merging of the INPUT/OUTPUT tasks; and when the efficiency increase value is greater than 0, taking the initialized merging time as an optimal INPUT/OUTPUT merging time; and a third step, according to the optimal INPUT/OUTPUT merging time, continuing to execute remaining INPUT/OUTPUT tasks issued by the host;

wherein the step of calculating a second mean value of the time consumed in processing each INPUT/OUTPUT during merging of the INPUT/OUTPUT tasks comprises:

$$u_2 = \frac{x_t + t}{n}$$

where $u_2$ is the second mean value of the time consumed in processing each INPUT/OUTPUT during merging of the INPUT/OUTPUT tasks, $x_t$ is the merging time, tis the total time consumed in processing the merged INPUT/OUTPUT tasks, and n is the total number of tasks of the merged INPUT/OUTPUT tasks and the remaining unmerged INPUT/OUTPUT tasks, wherein $u_2$, $x_t$, t and n are positive integers;

wherein the step of calculating an efficiency increase value during merging of the INPUT/OUTPUT tasks comprises:

$$\eta = \frac{u_1 - u_2}{u_1} \times 100$$

where $\eta$ is the efficiency increase value, $u_1$ is the first mean value of the time consumed in processing a single INPUT/OUTPUT when executed separately in sequence, and $u_2$ is the second mean value of the time consumed in processing each INPUT/OUTPUT during merging of the INPUT/OUTPUT tasks, wherein $u_1$, $u_2$ are positive integers.

8. One or more non-transitory computer-readable storage media, configured to store computer-readable instructions, wherein the computer-readable instructions, when executed by one or more processors, implement the steps of an INPUT/OUTPUT task processing method, the INPUT/OUTPUT task processing method comprises:

a first step, receiving a plurality of INPUT/OUTPUT tasks issued by a host and executing them separately in sequence, and making statistics of a first mean value of time consumed in processing a single INPUT/OUTPUT when executed separately in sequence;

a second step, continuing to receive a plurality of INPUT/OUTPUT tasks issued by the host, merging the INPUT/OUTPUT tasks for execution, and determining an optimal INPUT/OUTPUT merging time according to the first mean value of the time consumed in processing a single INPUT/OUTPUT when executed separately in sequence; wherein, acquiring an initialized merging time for merging the INPUT/OUTPUT tasks;

making statistics of a total time consumed in processing the merged INPUT/OUTPUT tasks, wherein the processing the merged INPUT/OUTPUT tasks comprises performing reading/writing processing on the merged INPUT/OUTPUT tasks and remaining unmerged INPUT/OUTPUT tasks;

calculating a second mean value of the time consumed in processing each INPUT/OUTPUT during merging of the INPUT/OUTPUT tasks;

according to the first mean value of the time consumed in processing a single INPUT/OUTPUT when executed separately in sequence and the second mean value of the time consumed in processing each INPUT/OUTPUT during merging of the INPUT/OUTPUT tasks, calculating an efficiency increase value during merging of the INPUT/OUTPUT tasks; and when the efficiency increase value is greater than 0, taking the initialized merging time as an optimal INPUT/OUTPUT merging time; and a third step, according to the optimal INPUT/OUTPUT merging time, continuing to execute remaining INPUT/OUTPUT tasks issued by the host;

wherein the step of calculating a second mean value of the time consumed in processing each INPUT/OUTPUT during merging of the INPUT/OUTPUT tasks comprises:

$$u_2 = \frac{x_t + t}{n}$$

where $u_2$ is the second mean value of the time consumed in processing each INPUT/OUTPUT during merging of the INPUT/OUTPUT tasks, $x_t$ is the merging time, tis the total time consumed in processing the merged INPUT/OUTPUT tasks, and n is the total number of tasks of the merged INPUT/OUTPUT tasks and the remaining unmerged INPUT/OUTPUT tasks, wherein $u_2$, $x_t$, t and n are positive integers;

wherein the step of calculating an efficiency increase value during merging of the INPUT/OUTPUT tasks comprises:

$$\eta = \frac{u_1 - u_2}{u_1} \times 100$$

where $\eta$ is the efficiency increase value, $u_1$ is the first mean value of the time consumed in processing a single INPUT/OUTPUT when executed separately in sequence, and $u_2$ is the second mean value of the time consumed in processing each INPUT/OUTPUT during merging of the INPUT/OUTPUT tasks, wherein $u_1$, $u_2$ are positive integers.

9. The INPUT/OUTPUT task processing method according to claim 6, wherein when the maximum efficiency increase is less than or equal to 0, letting the INPUT/OUTPUT merging time $x_t$=0, when the maximum efficiency increase is greater than 0, the INPUT/OUTPUT merging time $x_t$ remains unchanged.

10. The computer device according to claim 7, wherein the step of determining an optimal INPUT/OUTPUT merging time according to the first mean value of the time consumed in processing a single INPUT/OUTPUT when executed separately in sequence comprises:

acquiring an initialized merging time for merging the INPUT/OUTPUT tasks;

making statistics of a total time consumed in processing the merged INPUT/OUTPUT tasks, wherein the processing the merged INPUT/OUTPUT tasks comprises performing reading/writing processing on the merged INPUT/OUTPUT tasks and remaining unmerged INPUT/OUTPUT tasks;

calculating a second mean value of the time consumed in processing each INPUT/OUTPUT during merging of the INPUT/OUTPUT tasks;

according to the first mean value of the time consumed in processing a single INPUT/OUTPUT when executed separately in sequence and the second mean value of the time consumed in processing each INPUT/OUTPUT during merging of the INPUT/OUTPUT tasks, calculating an efficiency increase value during merging of the INPUT/OUTPUT tasks; and when the efficiency increase value is greater than 0, taking the initialized merging time as an optimal INPUT/OUTPUT merging time.

11. The computer device according to claim 9, wherein the step of calculating a second mean value of the time consumed in processing each INPUT/OUTPUT during merging of the INPUT/OUTPUT tasks comprises:

acquiring a total number of tasks of the merged INPUT/OUTPUT tasks and the remaining unmerged INPUT/OUTPUT tasks; and according to the merging time, the total time consumed in processing the merged INPUT/OUTPUT tasks and the total number of tasks, calculating a second mean value of the time consumed in processing each INPUT/OUTPUT during merging of the INPUT/OUTPUT tasks.

12. The computer device according to claim 9, wherein the step of determining an optimal INPUT/OUTPUT merging time according to the first mean value of the time consumed in processing a single INPUT/OUTPUT when executed separately in sequence, further comprises:

adjusting the merging time for merging the INPUT/OUTPUT tasks several times, calculating a plurality of efficiency increase values after adjustments, and taking a merging time corresponding to a maximum efficiency increase value as an optimal INPUT/OUTPUT merging time.

13. The non-transient computer-readable storage media according to claim 8, wherein the step of determining an optimal INPUT/OUTPUT merging time according to the first mean value of the time consumed in processing a single INPUT/OUTPUT when executed separately in sequence comprises:

acquiring an initialized merging time for merging the INPUT/OUTPUT tasks;

making statistics of a total time consumed in processing the merged INPUT/OUTPUT tasks, wherein the processing the merged INPUT/OUTPUT tasks comprises performing reading/writing processing on the merged INPUT/OUTPUT tasks and remaining unmerged INPUT/OUTPUT tasks;

calculating a second mean value of the time consumed in processing each INPUT/OUTPUT during merging of the INPUT/OUTPUT tasks;

according to the first mean value of the time consumed in processing a single INPUT/OUTPUT when executed separately in sequence and the second mean value of the time consumed in processing each INPUT/OUTPUT during merging of the INPUT/OUTPUT tasks, calculating an efficiency increase value during merging of the INPUT/OUTPUT tasks; and when the efficiency increase value is greater than 0, taking the initialized merging time as an optimal INPUT/OUTPUT merging time.

14. The non-transient computer-readable storage media according to claim 12, wherein the step of calculating a second mean value of the time consumed in processing each INPUT/OUTPUT during merging of the INPUT/OUTPUT tasks comprises:

acquiring a total number of tasks of the merged INPUT/OUTPUT tasks and the remaining unmerged INPUT/OUTPUT tasks; and according to the merging time, the total time consumed in processing the merged INPUT/OUTPUT tasks and the total number of tasks, calculating a second mean value of the time consumed in processing each INPUT/OUTPUT during merging of the INPUT/OUTPUT tasks.

* * * * *